March 29, 1949.  A. C. BEARDSLEE  2,465,963
REMOVING ULTIMATE MOISTURE
FROM POWDERED PRODUCTS
Filed June 2, 1945
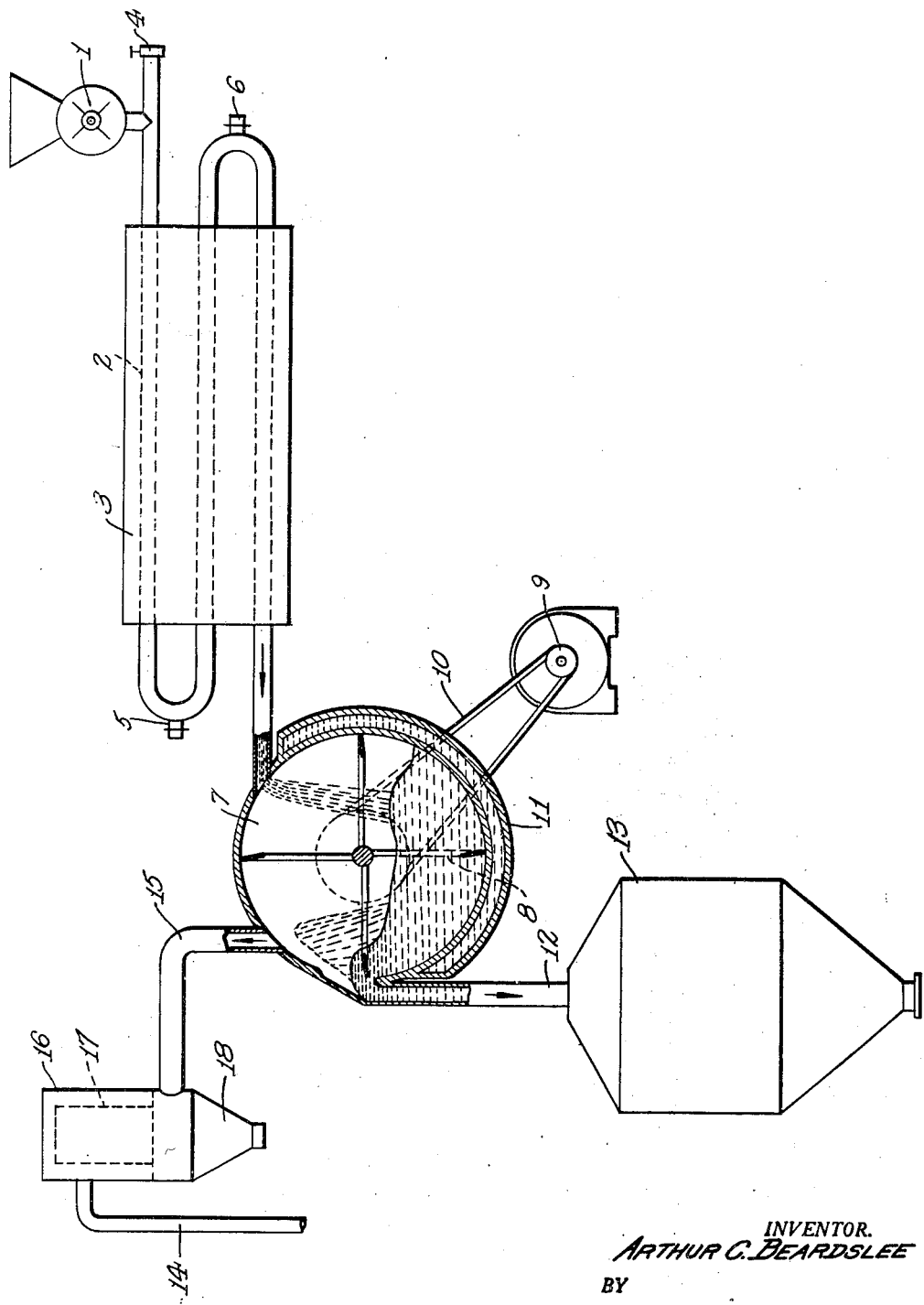
INVENTOR.
ARTHUR C. BEARDSLEE
BY
Edmund H. O'Brien
ATTORNEY Patented Mar. 29, 1949

2,465,963

UNITED STATES PATENT OFFICE 2,465,963

REMOVING ULTIMATE MOISTURE FROM POWDERED PRODUCTS

Arthur Carl Beardslee, Arcade, N. Y., assignor to The Borden Company, New York, N. Y., a corporation of New Jersey Application June 2, 1945, Serial No. 597,279

2 Claims. (Cl. 34—10)

This invention relates to the production of powdered products, particularly powdered food products, such as powdered milk, egg powder, or similar food products, of relatively very low moisture content. It is also concerned with the novel powdered food products of extremely low moisture content resulting.

In the preparation of powdered food products the desirability of a powdered product of such low moisture content as to represent practically the ultimate dryness obtainable for that particular product has been generally appreciated. For various reasons, however, this has previously been impossible of obtainment. Because these products are generally very poor conductors of heat, they can not be subjected to drying processes of a type applicable to products of higher heat conductivity. As a result, the powdered food products obtainable by previously available drying methods have been characterized by appreciable moisture content and lessened keeping properties.

When residual moisture in appreciable amounts is present in a powdered food product, such as powdered milk or egg powder, as it is in products produced by those processes now available for drying these food products, this moisture is sufficient to bring about deterioration of the product during storage. Deterioration of this character, which is, of course, very objectionable in powdered food products, may be fully checked, or at least very greatly retarded, by reducing the residual moisture content to a very low value. However the drying methods now available have not been successful in producing a powdered food product of low enough residual moisture content to prevent this deterioration.

This invention is concerned with a new and improved method for treating powdered products, particularly powdered food products, in order to secure a final product of the desired very low moisture content. In many cases the final product is of the practical ultimate dryness for that particular product. I have found that if the food product in powdered form is dried in a high vacuum under conditions such that heat is supplied to that product while it is in the vacuum chamber, and if the product is dispersed during its movement through the vacuum chamber, it is possible to obtain a final product having a residual moisture content very much lower than previously considered possible with powdered products of this type. The vacuum should be relatively high, 740 millimeters of mercury or higher, and the dispersion and movement of the product in the vacuum may be secured by agitation of various types as well as by bleeding small amounts of air into the vacuum chamber. My improved process is concerned with an improved method of drying, wtih the dried powdered food products of very low moisture content resulting, and with an improved method for agitating and cooling the dried powdered product before it is discharged into the product receiver, thus permitting its storage without any danger of subsequent deterioration.

It is, therefore, the principal object of this invention, to provide a new and improved method of drying a powdered product, particularly a powdered food product of relatively non-heat conducting characteristics, which method will result in a powdered product having a much lower percentage of residual moisture than ever previously obtainable. The residual moisture content is so low, in fact, as not to have been previously considered obtainable by any practical method of drying.

It is another object of this invention to provide an improved drying method wherein the powdered product, such as milk powder or egg powder, is heated while it is in a vacuum chamber at a relatively low absolute pressure, thereby causing the evaporation and removal of moisture from the powdered product. By the controlled and uniform application of heat in this manner the resulting food product is of lower residual moisture content than ever previously considered attainable.

It is still another object of this invention to carry out the drying under conditions wherein the powdered product is dispersed in the drying chamber, and caused to travel through that chamber, maintained under a high degree of vacuum, while it is heated. This may be accomplished by supplying to the powdered product in the vacuum chamber relatively very small quantities of air, admitted into the vacuum drying chamber through suitable valves, these quantities of air being so small in amount that they may be readily removed by the pumping and condenser equipment used to maintain the vacuum, without in any way interfering with the maintenance of the high degree of vacuum necessary.

It is a further object of my invention to lower the temperature of the finally dried product emerging from the vacuum drying chamber before it reaches the receiver or storage hopper, thus permitting storage of the powdered dry food product without deterioration. This may be accomplished, in one embodiment of my invention, by providing a cooled and agitated product holder in the vacuum line, at the outlet end of the heated drying chamber maintained under vacuum, the powdered product being held in this agitated holder and cooler, and discharged therefrom into the storage hopper, only after it has been cooled and agitated or dispersed in such a manner as to permit separation of all the moisture possible, while the product is being cooled to a temperature at which it may be stored without danger of deterioration.

The foregoing objects of my improved process for removing ultimate moisture from powdered products, as well as additional aims and objectives thereof, will be apparent from the ensuing disclosure.

In carrying out my improved drying process, the powdered food product travelling through a drying chamber maintained under a high degree of vacuum is heated while it is in the drying chamber. This heating is carried out regardless of the fact that the product may be relatively warm, 170° F. or higher, when it is introduced into the drying chamber. The method is therefore to be distinguished from methods of drying in which reliance for the heat necessary to drive out the moisture is placed on the heat present in the powdered product when it is introduced into the chamber, and no heat is supplied to that product while it is in the drying chamber.

A product containing residual moisture, such as a powdered food product, will give up its moisture when it is subjected to a vacuum high enough to overcome the vapor tension of that particular product at the particular temperature it is at. The higher the temperature, of course, the less the vapor tension that must be overcome.

Consequently the maintenance of a very high vacuum in the drying chamber tends to increase the evaporation of moisture from the product, and a high temperature has the same tendency. But rapid evaporation cools the product and, if heat is not supplied to a powdered food product, such as powdered milk, evaporation will not occur at any temperature below 130° F. under vacuum of any degree obtainable, even though the product was at a temperature of 170° F. when introduced into the drying chamber.

In accordance with my method heat is supplied to the powdered product in order to continue the evaporation, and this is necessary even though the saturation temperature due to the high degree of vacuum employed may be as low as 35° F. A portion of the moisture originally contained in the product is given off with each rise in temperature, and a consequent cooling takes place, but to continue the evaporation the product temperature has to be maintained by heat externally applied. This also means that cooling must be applied to the powdered product before it is released from the vacuum and immediately following the removal of vapor. To accomplish such a controlled and uniform application of heat within a vacuum to a perishable food product having low heat conductivity, easily injured by any overheating, requires continuous and effective movement of the food product through the vacuum chamber, and effective separation of vapor when the product is cooled. These principles have never been previously understood or applied in the vacuum drying of powdered materials, especially those capable of being easily injured or destroyed, such as powdered milk or powdered egg.

In order to insure the transference of heat to the powdered product in the vacuum drying chamber in order that evaporation of residual moisture may continue, at the same time preventing injurious local overheating, it is essential both to disperse the product in the vacuum chamber, and to move it through this chamber in such a way as to cause intermittent and repeated contact of the product with the heated surfaces of the drying chamber. This may be effected by vibrating the walls of the vacuum drying chamber, as by providing vibrators at regular intervals along the exterior of its wall, or it may be very readily accomplished by introducing small amounts of air into the vacuum chamber at spaced intervals along the path of travel of the powdered product. This air, admitted in relatively very small amounts, may be predried or otherwise treated to minimize the introduction of moisture into the drying chamber.

My process involves, as the first step, introducing the powdered food product to be dried into the drying chamber maintained under a relatively high vacuum. I have secured very good results with a vacuum of 750 millimeters of mercury, i. e. an absolute pressure in the drying chamber of about 10 millimeters of mercury. This drying chamber may be of any suitable form or type, but is advantageously in the form of a long tube. I have secured very good results with a tube two inches in external diameter, with a 16 gauge wall, this tube being approximately 250 feet in length. This tube may communicate with a hopper and, with a hopper of suitable size, say about 8 feet in diameter and 15 feet high, will dry a powdered food product at the rate of approximately 1500 pounds per hour.

For introducing the powdered product into the drying tube or chamber, the vacuum chamber should be provided with a suitable inlet valve which will permit the material to be introduced without destroying the vacuum maintained. This valve may be of various types, and any valve which will serve to exclude the air, at the same time admitting the powdered product, will give satisfactory results. Since the vacuum is relatively high, however, the valve must be an efficient one.

The powdered product, which is preferably one which has been dried by conventional drying methods to as great an extent as possible before its introduction into the drying chamber, travels through and is dried by the application of heat thereto. Any method of heating the powdered product while it is in the vacuum drying chamber will be satisfactory, and I have secured very satisfactory results by providing the vacuum drying chamber or tube with a surrounding heated water jacket. However other suitable means of providing a heat input to the powdered product may be utilized. The high degree of vacuum maintained and the high temperature to which the product is heated while in the drying chamber result in rapid evaporation of moisture from the powdered product. However this rapid evaporation cools the product, and heat must be applied at such a rate that the powdered food product will not drop below a temperature at which the residual moisture can be removed from the product under the particular low pressure conditions maintained in the drying chamber. In a typical case this may require, for example, heating a powdered food product such as powdered milk to a temperature of 130° F. while it is in the vacuum chamber. The particular temperature that must be maintained will depend, of course, on the powdered product treated and the pressure conditions at which the drying is carried out. It is frequently desirable to introduce the powdered product into the vacuum chamber at a relatively higher temperature, a temperature of about 170° F., for example, and this is especially desirable and practical when the food product is one that has first been subjected to drying by conventional drying methods.

Heat is supplied to initiate and continue the evaporation, and with each rise in temperature a portion of the moisture contained originally in the powdered product is driven off. Since evaporation is accompanied by cooling, as previously pointed out, the temperature of the product has to be maintained by externally applied heat. To secure the controlled and uniform heating of the food product while it is in the vacuum drying chamber which is characteristic of my method, and to effect the heating under those conditions of a sensitive food product which is easily injured or damaged by local overheating, it is necessary for the powdered material to move continuously and progressively through the drying chamber. During this time efficient contact of the powdered material, which is a relatively poor conductor of heat, with the heated walls of the vacuum chamber is brought about by subjecting the material to agitation. An efficient way of doing this is to admit air in very small amounts at various points along the drying tube, this air serving to disperse the powdered product and bring it into contact with the heated surfaces of the vacuum chamber, at the same time assisting in its movement through that drying chamber. The amount of air admitted, however, is limited in amount so as not to interfere with the maintenance of the vacuum, being only an amount such that it may be fully exhausted by the condenser and vacuum pump employed without lowering the vacuum below about ten millimeters of mercury absolute pressure. It is also desirable that this air be dried before it is admitted to the drying chamber, thus avoiding the introduction of undesirable amounts of moisture. The air may advantageously also be heated, so as not to interfere with the maintenance of the desired elevated temperature.

When the powdered material is removed from the vacuum chamber, especially when it is a sensitive food product such as egg powder, it is essential that it be cooled and agitated before being discharged to a storage hopper. This may be readily accomplished by various means. By providing an agitated holder and cooler in the vacuum line I have secured such agitation and reduction in temperature of the powdered product and have also desirably retarded the progressive moment of the powdered product through the system. This holder may contain an agitating device such as a rotary vaned propeller, and may be provided with a water jacket or other cooling means.

It is advantageous that the powdered product be held under vacuum while being agitated and cooled to storage temperature, in this way avoiding all danger of deterioration of the food product. The product, as discharged from the agitated holder and cooler, is characterized by an extremely low moisture content, much lower than previously considered possible, and improved keeping properties of an outstanding order. In many cases with powdered food products such as powdered milk or egg powder the moisture content is reduced to 2% or less.

It is significant that my process is a continuous one which can continuously take a cold powdered product, reduce its moisture content, and cool it down again to room temperature, all under a high degree of vacuum. It is characterized, as one feature, by the careful and controlled application of heat to the product while it is in the vacuum drying chamber. It treats food products, such as powdered milk or egg powder, which have to be very low in residual moisture if they are to be stored without deterioration, and treats them in a continuous process under a high degree of vacuum, 740 millimeters of mercury or above. Air is effectively excluded, it being allowed to enter only in the small amounts necessary to insure dispersion and movement of the product through the chamber. This is a unique function for the air bled into the vacuum chamber in my process, and air has not previously been used for this purpose in the drying processes now available. Efficient, yet controlled, contact of the powder with the heated surfaces is secured, the product being heated by repeated, yet intermittent, contact with the hot walls of the tube. In this way danger of coating or insulating the heated surfaces is avoided.

The resistance of the powdered product in mass to the transfer of heat is thus overcome by agitation, which assists in the heat transfer.

The vapor evolved in the evaporation is removed at the point where heating ceases and cooling begins. If this is not done, any appreciable cooling effect will tend to cause condensation and reabsorption of moisture by the product being cooled. The mixing and repeated contact with the cooling surface in the cooling operation gives uniform results, with the time delay necessary to effect the cooling.

The product, cooled to remove any temporary overheat, is collected upon being withdrawn from the vacuum chamber. It is collected finally in a closed storage chamber.

While various forms of apparatus may be used in carrying out my improved process, the annexed schematic drawing shows one form which has been found very satisfactory. In this form the vacuum drying chamber, in the form of a long tube, is provided with heating means, such as a water jacket adapted to contain heated water, or it may be otherwise heated.

Referring more particularly to the apparatus shown in this drawing, the powdered food product is introduced through the rotary inlet valve 1. This valve may be a balanced valve, capable of being opened by the weight of the powder above the valve, thus permitting introducing the powdered food product into the vacuum chamber without admitting air. However, valves of other types may also be utilized, and the particular form of valve is no part of my invention. The maintenance of a high vacuum, for example a vacuum of about 750 millimeters of mercury, i. e. an absolute pressure of 10 millimeters, being preferred, requires that the rotary admission valve be efficient in excluding air.

The powdered food product travels along the vacuum drying tube 2, and is heated, under vacuum, thereby driving out the residual moisture, in accordance with the principles explained above. The vacuum drying tube is shown as provided with a heated water jacket 3, although other methods of heating the tube, and the powdered food product therein, may be employed.

Relatively small amounts of air are allowed to enter at the valves 4, 5, and 6, this air serving to agitate the powdered material, so that it is more efficiently heated, at the same time preventing local overheating which might occur, and might result in the destruction of the powdered product, since it is of a perishable nature and a relatively poor conductor of heat, if it were allowed to remain too long in contact at one point with the heated surfaces of the tube. The air admitted at valves 4, 5, and 6 also serves to assist the travel of the powdered material along the vacuum tube.

After leaving the vacuum tube 2 the powdered material enters the agitated holder and cooler 7, in which it is held for some time while being agitated by means of the agitator blades 8. As shown, the rotary vaned agitator 8 is driven from motor 9 by means of belt or sprocket chain 10. The agitated holder and cooler 7 is provided with a water jacket 11 filled with cold water, thus cooling the powdered product. The dotted lines indicate how the powdered product is dispersed by the blades of the agitator 8 in the agitated holder and cooler, while the level of the powdered material is shown by the full line. It will be noted that the rotary agitator blades or vanes are so arranged as to stir up the powdered product, at the same time permitting it to remain in the holder and cooler for a period of time sufficient to bring about the desired cooling down to room temperature before it is discharged through the pipe or conduit 12 to the product receiver 13. This may be accomplished in various ways, one way being to arrange the rotary agitator so that the blades do not fill the entire cross section of the holder and cooler 7, so that they serve merely to stir up the powdered material and discharge a part thereof, as shown in the drawing, into the discharge pipe 12.

The vacuum is maintained by a condenser and vacuum pump (not shown) in communication with conduit 14. As shown, the agitated holder and cooler 7 is in the vacuum line, the vapor and air being drawn off therefrom through the pipe or conduit 15 into an air filter 16, which is in communication with the condenser and vacuum pump. This filter is provided with filtering member 17 which permits the moisture and air to be withdrawn from the apparatus to the condenser and pump, thus maintaining the desired high degree of vacuum. Any powdered material carried with the stream as far as the air filter is removed by that filter and collects in the conical bottom 18 of the filter element 16.

As an example of treating a powdered food product in accordance with my improved method, egg powder having about 3% moisture content was dried to a moisture content of less than 2% at the rate of 1500 pounds per hour. The egg powder was continuously supplied to a vacuum drying chamber which was in the form of a smooth tube 2 inches in external diameter, 16 gauge wall, and approximately 250 feet in length. A high degree of vacuum was maintained in the vacuum drying tube, the absolute pressure being about 6 millimeters of mercury. Heat was supplied to the outside of the drying tube by means of a water bath having a temperature of 180–190° F. Small quantities of dried air were admitted through several one-eighth inch petcocks at regular intervals along the vacuum drying tube. In one embodiment three electrically motivated vibrators spaced at regular intervals along the tube were also employed, but these are not essential. The egg powder was at an elevated temperature when introduced into the drying chamber and when cooled in the hopper had a moisture content of less than 2%.

It will be understood that various changes and modifications may be incorporated in my process as described without departing from the spirit or scope of my invention. It is intended that such changes and modifications, as are within the purview of the appended claims, shall be regarded as within the scope of my invention.

I claim:

1. The process of removing ultimate moisture from a powdered food product which comprises continuously feeding said powdered product through a vacuum drying chamber wherein the pressure does not exceed that corresponding to about 20 millimeters of mercury absolute pressure, externally heating said product during its passage through said chamber, bleeding in controlled amounts of air to assist in the movement of said powdered product through said drying chamber and to disperse said product, whereby evaporation of moisture is favored and local overheating prevented, agitating and cooling said powdered product under vacuum, separating evolved vapor from said powdered product while it is being agitated and cooled, and discharging said dried powdered product to a storage receptacle.

2. The process of removing ultimate moisture from a powdered food product selected from the group which consists of powdered milk and egg powder which comprises passing said powdered food product through a vacuum drying chamber maintained at a reduced pressure not exceeding that corresponding to about 10 millimeters of mercury absolute pressure externally heating said product during its passage through said chamber, agitating said powdered food product while it is in said drying chamber, admitting limited controlled amounts of air into contact with said product in said drying chamber in order to disperse said product and assist in its movement through the drying chamber, at the same time preventing local overheating and deterioration of said powdered product, cooling and agitating said powdered product while it is under said reduced pressure after it leaves said drying chamber, removing evolved vapor from said powdered product during said agitation and cooling, and discharging said powdered food product to a storage receptacle.

ARTHUR CARL BEARDSLEE.

REFERENCES CITED

The following references are of record in the file of this patent:

UNITED STATES PATENTS

| Number | Name | Date |
|---|---|---|
| 184,192 | Walz et al. | Nov. 7, 1876 |
| 690,592 | Lapp | Jan. 7, 1902 |
| 1,080,602 | Stokes | Dec. 9, 1913 |
| 1,086,950 | Stanton | Feb. 10, 1914 |
| 1,318,385 | Huhn | Oct. 14, 1919 |
| 1,478,526 | Merrell | Dec. 25, 1923 |
| 2,085,842 | Wentworth | July 6, 1937 |
| 2,132,095 | Broughton | Oct. 4, 1938 |
| 2,278,701 | Karr | Apr. 7, 1942 |
| 2,297,726 | Stephanoff | Oct. 6, 1942 |
| 2,387,458 | Mojonnier | Oct. 23, 1945 |

FOREIGN PATENTS

| Number | Country | Date |
|---|---|---|
| 446,469 | Germany | July 2, 1927 |